United States Patent Office 3,433,654
Patented Mar. 18, 1969

3,433,654
FIRE RETARDANT BITUMINOUS COMPOSITIONS
Charles S. Ilardo, Tonawanda, and Raymond R. Hindersinn, Lewiston, N.Y., assignors to Hooker Chemical Corporation, Niagara Falls, N.Y., a corporation of New York
No Drawing. Filed Sept. 20, 1965, Ser. No. 488,744
U.S. Cl. 106—15                          18 Claims
Int. Cl. C09d 5/18, 3/24

ABSTRACT OF THE DISCLOSURE

Bituminous compositions can be rendered fire retardant by the addition thereto of a Diels-Adler adduct of a non-conjugated unsaturated fatty ester and a polyhalogenated cyclopentadiene having the formula:

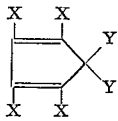

wherein X is selected from the group consisting of fluorine, chlorine and bromine, and Y is selected from the group consisting of fluorine, chlorine, bromine and an alkoxy radical, said Diels-Adler adduct containing about 10 to 50 weight percent halogen.

---

This invention relates to novel fire retardant bituminous compositions and to methods for rendering bituminous materials fire retardant.

Bituminous materials find numerous commercial applications, such as in roofing materials, which may be either asphalt shingles or built-up roofs. Additional uses are in coated or impregnated papers, floor tiles and protective coatings, emulsions and paints, for example, for coating outdoor wooden structures. These and other uses are better served by bituminous compositions that are fire retardant and flame resistant.

Accordingly, it is an object of this invention to provide fire retardant bituminous compositions. It is a further object of this invention to provide methods for reducing the flammability of bituminous materials to the non-burning state.

Another object of this invention is to provide a novel bituminous composition which, when exposed to flame, will generate an intumescent insulating layer and at the same time generate flame extinguishing gases upon high temperature decomposition of the bituminous film.

Another object of this invention is to provide a bituminous composition of improved initial weathering characteristics.

These and other objects of the invention will become apparent as the description of the invention and the examples illustrative thereof are more fully developed in the specification.

In accordance with this invention there is provided a fire retardant bituminous composition comprised of (a) a bituminous material and (b) a Diels-Adler adduct of a nonconjugated unsaturated fatty ester and a polyhalogenated cyclopentadiene of the formula:

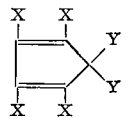

wherein X is selected from the group consisting of fluorine, chlorine and bromine and Y is selected from the group consisting of fluorine, chlorine, bromine and an alkoxy radical, said Diels-Adler adduct containing about 10 to 50 weight percent halogen. The alkoxy mentioned generally contains from 1 to 10 carbon atoms and will preferably contain from 1 to 6 carbon atoms. The most preferred halogens are chlorine and bromine.

The present invention provides the particular advantage of fire retardancy in bituminous compositions while retaining the normal heat stability of bituminous compositions at application temperatures. In the application of bituminous compositions to roofs and floors, the composition is usually heated to above its melting or softening point to provide a free flowing liquid. Extensive heating at temperatures of 100 degrees centrigrade to 200 degrees centigrade are often encountered. Other fire retardant materials often decompose or react with the bituminous material, thereby gelling or otherwise destroying the stability of the composition. The present compositions are extremely stable, even at 200 degrees centigrade and therefore, can be held at the desired melt temperature for extended periods of time without danger of degradation.

The fatty esters reacted with the polyhalogenated cyclopentadiene may be the reaction products of mono- or polyhydric alcohols and nonconjugated, ethylenically unsaturated fatty acids of 8 to 26 carbon atoms. The monoalcohols used are saturated or ethylenically unsaturated, substituted or nonsubstituted alcohols of 1 to about 18 carbon atoms. The substituents can be halogen, alkyl or phenyl. When nonconjugated unsaturation is provided in the alcohol, such unsaturation is useful for the further adduction of polyhalogenated cyclopentadiene.

Polyhydric alcohols are normally preferred partly because the glyceride esters of the preferred fatty acids are readily available from vegetable and marine oils. In addition to glycerine, other polyhydric alcohols such as ethylene glycol, diethylene glycol, pentaerythritol, dipentaerythritol, sorbitol, and the like, and mixtures thereof, are used with correspondingly good results.

The fatty acids used are nonconjugated, ethylenically unsaturated carboxylic acids of 8 to 26 carbon atoms. The most preferred carboxylic acids are oleic, linoleic and linolenic. Thus, the esters used are the reaction products of the described carboxylic acids with methyl, ethyl butyl, isobutyl, amyl, hexyl, octyl, and other such monoalcohols, ethylene glycol, diethylene glycol, glycerol, pentaerythritol, sorbitol, trimethylolethane, and other such polyhydric alcohols.

The most preferred esters are the glyceride esters of fatty acids and particularly the fatty esters generally known as drying and semi-drying oils, such as soya, linseed, safflower, peanut, corn, cod, anchovy, and the like vegetable and marine oils having iodine values of about 60 or more. In view of the fact that the reactions and methods of this invention are essentially the same for the described esters, the invention will be further described with particular emphasis on the most preferred esters. However, it is to be understood that when describing the preferred embodiments, other herein described embodiments are to be included as capable of being substituted therefor.

Polyhalogenated cyclopentadienes suitable for use in this invention include: hexachlorocyclopentadiene, 5,5-dimethoxytetrachlorocyclopentadiene, hexabromocyclopentadiene, 5,5-dibromotetrachlorocyclopentadiene, 5,5-difluorotetrachlorocyclopentadiene and 5,5-diethoxytetrachlorocyclopentadiene. The preferred polyhalogenated cyclopentadiene is hexachlorocyclopentadiene.

The adduct is made by reacting 0.1 to 1.1 equivalent polyhalogenated cyclopentadiene per equivalent of ester. With safflower oil which has an iodine value of about 145, which corresponds to about 5 positions of ethylenic unsaturation per ester molecule, theoretically, 5 moles of polyhalogenated cyclopentadiene can be adducted per mole of ester. However, it is most preferred to adduct 0.5 to 1.0 equivalent polyhalogenated cyclopentadiene per equivalent of ester to thereby form an adduct containing 10 to 50 percent by weight of halogen.

A preferred Diels-Alder adduct is the adduct of hexachlorocyclopentadiene and safflower oil. This adduct is prepared by charging the hexachlorocyclopentadiene and safflower oil to a reaction vessel and heating at about 150 degrees centigrade to 250 degrees centigrade until the desired amount of adduction has occurred. A particularly useful adduct is obtained when an average of about 4.5 moles of hexachlorocyclopentadiene has been adducted to one mole of safflower oil.

Many types of bituminous materials are commercially available, ranging from those derived from petroleum (asphaltic products) to those derived from coal tar. The asphaltic products include native asphalts, residual asphalts, blown petroleum asphalts precipitated by propane, fatty acid pitches, and asphalts modified with oil such as linseed oil, cotton seed oil, castor oil, vegetable oils and animal oils, and various mixtures thereof. The tar products include pitch obtained by distilling the highly volatile oils from coal tar as well as combinations thereof with oil, gas tar and water gas tar. These materials are provided in the form of semi-liquids to semi-solids where they are to be used for impregnating felted or woven fabrics in roofing or insulating compositions. The same groups of substances are also commonly prepared in a harder form with a higher fusion point. These and other bituminous materials are useful in the present invention.

The halogenated Diels-Alder adducts of the present invention are desirably incorporated in the bituminous materials in an effective fire retardant proportion. Generally, halogenated Diels-Alder adducts in an amount from about 2.5 to about 50 percent by weight of the bituminous composition and preferably from about 5 to 40 percent by weight are mixed with bituminous material, thereby incorporating 1 to about 25 percent halogen by weight of the bituminous material into said bituminous composition.

Improved fire retardancy can be provided by incorporating into the bituminous composition, a compound containing a Group Va element selected from the group consisting of antimony, arsenic or bismuth and particularly, the oxides or sulfides thereof. Such additions are made in an amount from about 2.5 to about 20 percent by weight of said bituminous material and preferably about 5 to 10 percent.

Antimony oxide is the antimony compound that is presently preferred for use in the present invention. However, many antimony compounds are suitable. Suitable antimony compounds include the sulfides of antimony, the alkali metal salts of Group I of the Periodic Table, antimony trivalent and pentavalent salts of organic acids and their derivatives and the esters of trivalent and pentavalent antimony acids and their derivatives. It is convenient to use sodium antimonite or potassium antimonite when it is desired to use an alkali metal salt of antimony for compositions of this invention. United States Patent 2,996,528 discloses suitable antimony salts of organic acids and their derivatives. Compounds of this class include antimony butyrate, antimony valerate, antimony caproate, antimony heptylate, antimony caprylate, antimony pelargonate, antimony caprate, antimony cinnamate, antimony anisate, and their halide derivatives. Likewise the esters of antimony acids and their derivatives are disclosed in United States Patent 2,993,924, such as tris(n-octyl)antimonite, tris(2-ethylhexyl)antimonite, tribenzyl antimonite, tris(beta-chloroethyl)antimonite, tris(beta-chloropropyl)antimonite, tris(beta-chlorobutyl)antimonite, and their halide derivatives. Still other suitable organic antimony compounds are the cyclic antimonites such as trimethylol cyclopropane antimonite, pentaerythritol antimonite and glycerol antimonite. Satisfactory results are also obtained with the oxides and sulfides of bismuth and arsenic, as well as lead arsenate.

The temperature of mixing the components of the invention is not critical and may range from the temperature at which the bituminous material becomes fluid up to the decomposition temperature of the said bituminous material, e.g., about 20 degrees centigrade to about 260 degrees centigrade.

The "stabilized" asphalt used in the examples contained asbestos fiber. It is also within the scope of the present invention to use unstabilized asphalts and other bituminous materials as well as to employ other powdered or fibrous fillers, pigments and so forth, that are known in the art. Such substances may be either inorganic or organic in origin. They are used for reducing the cost of the finished product, to impart weather resistance or to impart color to the surface coatings. Commonly used additives include silica, limestone, slate dust, clay, black and colored pigments, and calcium carbonate. Various halogenated wax products may also be incorporated in the compositions of the invention.

The bituminous compositions of this invention find many commercial applications. They can be used for saturating felts that are subsequently used as intermediate products in the manufacture of prepared roofings and composition shingles, for constructing built-up roofs, for the manufacture of bituminized floor coverings, for waterproofing cloths, such as tarpaulins, coatings for metals, gypsum board, and other applications in which bituminous saturated felts are commonly used. The bituminous compositions can be used in many coating applications such as in the manufacture of shingles, siding for home construction, wrapping and packing paper, electrical transmission insulation, cords and ropes, bituminized wallboard, insulating board and the like, bituminous pipe and asphalt mastic roofs. Other applications include bituminous lacquers and cements. In all such applications the industrial requirements are becoming more stringent regarding the use of fire retardant bituminous compositions. The compositions of this invention satisfy this fast growing need.

The bituminous compositions described can be applied to a substrate with the aid of heat and/or pressure in order to achieve a uniform coating with satisfactory bonding characteristics between the coating and the substrate. However, in many cases the use of heat and/or pressure to achieve a coating is not convenient and in such cases a solvent can be used to reduce the viscosity of composition to a brushable, sprayable or otherwise pliable consistency. The solvent method is the convenient method for applying bituminous coatings to roofs, fences, bridges, and such items, but it suffers from the fire hazards usually associated therewith during application. Therefore, it is another aspect of this invention to provide fire retardant bituminous compositions which are fire retardant when utilizing a solvent in applying the bituminous compositions to substrates. Such fire retardant coating compositions may contain from about 5 to 85 percent and usually from about 30 to about 75 percent of the bituminous fire retardant compositions as previously described. The remaining proportion of the coating composition is a volatile solvent and preferably a volatile halogenated hydrocarbon solvent which is compatible with the Diels-Alder adduct and the bituminous material. When non-halogenated hydrocarbon solvents such as mineral spirits, kerosene, and the like, are used, the fire retardancy of the solvent thinned compositions are not as effective until after the evaporation of most of the solvent. However, the dried coating composition exhibits the same fire retardancy when flammable solvents are used as when no solvents or halogenated solvents are used.

The use of halogenated hydrocarbon solvents result in compositions which are fire retardant even when thinned to viscosities in the range of 10 to 1000 centipoises at 25 degrees centigrade. The products of higher viscosity may be thinned by the application of heat in a controlled fashion. One does not have to apply as much heat to thin such compositions to the desired viscosity as would be used in the absence of the solvent.

The preferred solvents have the boiling points which allow for the rapid evaporation thereof after the application of the fire retardant bituminous compositions, yet is employed in such a proportion and is of such properties that the uniform coatings are obtained when the composition is applied by spray means. The desired boiling point is usually in the range of about 30 degrees centigrade to about 200 degrees centigrade and preferably is of about 40 degrees centigrade to 150 degrees centigrade. The halogenated solvents described are not flammable and exert a "snuffing action," preventing or inhibiting ignition of the coating composition while it is being applied. This snuffing action is particularly useful when the invented compositions are being sprayed so that minute particles and vapors of bituminous matter are not ignited. The preferred halogenated solvent in the invented fire retardant bituminous compositions is trichloroethylene, although other halogenated hydrocarbon solvents, preferably chlorinated unsaturated hydrocarbons from 1 to 2 carbon atoms, are also used successfully. Among the satisfactory halogenated solvents, listed with their boiling points, are the following.

| Solvent: | Boiling point, degrees centigrade |
| --- | --- |
| Methylene chloride | 40 |
| Trichlorotrifluoroethane | 46 |
| 1,2-dichloroethylene | 60 |
| Chloroform | 61 |
| Trichloroethane | 74 |
| Carbon tetrachloride | 77 |
| Trichloroethylene | 87 |
| Tetrachlorodifluoroethane | 92 |
| Bromochloroethane | 107 |
| Dibromoethane | 110 |
| Perchloroethylene | 121 |
| Unsym-tetrachloroethane | 130 |
| Sym-tetrachloroethane | 146 |

Mixtures of the above solvents may also be used to obtain the exact evaporation rate, viscosity, flash-fire inhibition or other property desired.

The following examples are presented to illustrate the invention further, without being limited thereby. All parts and percentages are by weight and all temperatures are in degrees centigrade, unless otherwise indicated.

Example 1.—Preparation of safflower oil adduct fire retardant

Hexachlorocyclopentadiene (246 parts) and 175 parts of safflower oil were charged to a reaction vessel equipped with a stirrer, condenser, thermometer, heating mantle and nitrogen inlet and outlet. The charge was slowly brought to a temperature of 180 degrees centigrade under a nitrogen atmosphere and maintained at that temperature for 24 hours. The reaction mixture was then vacuum stripped, at 180 degrees centigrade and an absolute pressure of less than one millimeter of mercury, to yield a product which was a dark brown semi-solid at room temperature. The product analyzed 44 to 45 percent chlorine, had a density at 24 degrees centigrade of 1.35 grams per cubic centimeter and a Brookfield viscosity of 12.5 poises at 100 degrees centigrade.

Example 2.—Preparation of base material 60.5 parts of asphalt were heated to 200 degrees centigrade. The molten asphalt was then removed from the source of heat and 32.5 parts of mineral spirits were added with stirring. Stirring was continued and 7.0 parts of finely divided asbestos fiber (Quebec Asbestos Standard Grade 7R) were added. The mixture was then cooled to room temperature at which temperature it was a free flowing liquid. This composition was used as a base bituminous material for the flame retardant composition of the following examples. When it is desirable to prepare solvent thinned compositions with halogenated solvents such as trichloroethylene, the above procedure is used except that the desired solvent is substituted for a like amount of mineral spirits of Example 2.

Example 3.—Fire retardant compositions

To 100 parts of the base material of Example 2 were added 6.1 parts (10 percent based on asphalt content) of the safflower oil adduct of Example 1 and three parts (5 percent based on asphalt content) of antimony oxide. The safflower oil adduct was heated to about 80 degrees centigrade and then added to the base material which was at room temperature. The mixture was stirred until uniform.

A coating was applied to three inch by twelve inch pieces of felt previously saturated with asphalt known as composition shingle, by applying the prepared asphalt composition with a knife at a coverage rate of two gallons for each 100 square feet. This coverage provided a dried film of about $\frac{1}{16}$ of an inch. The felt with an applied asphalt coating was then laminated by placing one piece over the other to form two ply lay-ups. The lay-ups were allowed to dry for three days at room temperature, then at 50 degrees centigrade for 24 hours thereby removing substantially all of the solvent.

Testing was performed to determine the relative flammability of the coating by supporting the various prepared lay-up strips at an angle of 60 degrees from the vertical, in a draft free hood, and applying a flame from a compressed propane portable blow torch. The torch flame was adjusted to give a 1½ inch inner blue cone and was applied perpendicular to the face of the strip for a period of 15 seconds and then removed. The time for self-extinguishing was recorded. A second 15 second flame application was made immediately after the first flame was extinguished and the time for self-extinguishing after the second application of the flame was recorded. If the specimen was self-extinguishing or did not burn upon the second ignition it was judged to be self-extinguishing by this test. Intumescence was measured at the highest point of rise.

The prepared composition of this example was self-extinguishing in 2.2 seconds after the first ignition and 5.0 seconds after the second ignition. An intumescence of 0.31 inch was observed.

Examples 4–10

In a manner similar to Example 3 other compositions in which 6.1 parts of the adduct of Example 1 were used were prepared and tested. Results are summarized in the table below.

TABLE I

| Example | Metal compound | Parts metal compound | Self-extinguishing time (seconds) 1st application | Self-extinguishing time (seconds) 2nd application | Intumescence (inch) | Flammability |
| --- | --- | --- | --- | --- | --- | --- |
| 4 | Antimony oxide | 1.7 | 6.9 | 11.1 | .22 | Self-extinguishing. |
| 5 | Arsenic oxide | 5.0 | 3.0 | 6.5 | .22 | Do. |
| 6 | Antimony sulfide | 5.0 | 2.2 | 4.6 | .29 | Do. |
| 7 | Lead arsenate | 5.0 | 3.9 | 10.8 | .22 | Do. |
| 8 | None | | 4.9 | 8.7 | 0.10 | Do. |
| 9 [1] | Antimony oxide | 5.0 | 7.0 | Burns | None | Burns. |
| 10 [1] | None | | Burns | Burns | None | Do. |

[1] No fire retardant adduct in these compositions.

Similar results are obtained when the fire retardant is a Diels-Alder adduct of 5,5-dimethoxytetrachlorocyclopentadiene, hexabromocyclopentadiene, 5,5-dibromotetrachlorocyclopentadiene, 5,5-difluorotetrachlorocyclopentadiene or 5,5-diethoxytetrachlorocyclopentadiene, rather than hexachlorocyclopentadiene.

Examples 11–13

To 100 parts of the base material prepared as in Example 2 were added 6.1 parts (10 percent, based upon asphalt content) of various Diels-Alder adducts of hexachlorocyclopentadiene prepared by the method of Example 1 and three parts (5 percent, based upon asphalt content) of antimony oxide. Each mixture was stirred until uniform. Again, felt lay-ups were prepared and tested as in Example 3. The test results obtained are summarized in Table II.

abut 8 and about 26 carbon atoms, and a polyhalogenated cyclopentadiene having the formula:

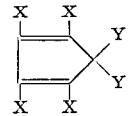

wherein X is selected from the group consisting of fluorine, chlorine and bromine, and Y is selected from the group consisting of fluorine, chlorine, bromine and an alkoxy radical containing from about 1 to about 10 carbon atoms, said Diels-Alder adduct containing about 10

TABLE II

| Example | Oil adducted to prepare fire retardant | Percent chlorine in adduct | Self-extinguishing time (seconds) | | Intumescence (inch) | Flammability |
|---|---|---|---|---|---|---|
| | | | 1st application | 2nd application | | |
| 11 | Soybean | 45 | 2.0 | 18.0 | .25 | Self-extinguishing. |
| 12 | Cottonseed | 43.2 | 1.7 | 7.0 | .28 | Do. |
| 13 | Corn | 44.9 | 3.1 | 26 | .19 | Do. |

Example 14

Additional amounts of the composition of Example 3 were prepared from which test specimens similar to those of Example 3 were prepared and tested. Some of the test panels were dried for three days at room temperature and then at 50 degrees centigrade for 24 hours. The panels were then weighed and subsequently immersed in a vessel containing circulating distilled water. The panels were retained in the distilled water for 24 hours at a temperature of 50 degrees centigrade. The panels were then dried to a constant weight and the weight losses were calculated. Thereafter, control and treated (water washed) panels were tested for fire retardancy.

| Adduct | Parts of adduct | Parts of antimony oxide | Self-extinguishing time (seconds) | | Intumescence (inches) | Percent weight change |
|---|---|---|---|---|---|---|
| | | | 1st application | 2nd application | | |
| Original: | | | | | | |
| None | | | >60 | | None | |
| Safflower | 6.1 | 3 | 0.5 | 2.3 | 0.35 | |
| Water Washed: | | | | | | |
| None | | | >60 | | None | −2.1 |
| Safflower | 6.1 | 3 | 0.9 | 2.5 | 0.35 | −2.9 |

It is thus seen that the fire retardant compositions of the present invention are extremely resistant to water leaching. The extinguishing properties are just as good after the water wash as before. This desirable property of the present compositions makes them particularly useful in applications such as exterior roofings and sidings, where weather and water resistance are necessary.

While this invention has been described with reference to certain specific embodiments the compositions and methods described are not intended to be understood as limiting the scope of the invention as it is realized that changes therein are possible and it is further intended that each element recited in any of the following claims is to be understood as referring to all equivalent elements for accomplishing substantially the same results in substantially the same or equivalent manner, it being intended to cover the invention broadly in whatever form its principles may be utilized.

What is claimed is:

1. A fire retardant bituminous composition comprising (a) a bituminous material and (b) the Diels-Alder adduct a nonconjugated unsaturated fatty ester reaction product of mono- or polyhydric alcohols having between about one to about 18 carbon atoms, and non-conjugated, ethylenically unsaturated fatty acids having between 8 and 26 carbon atoms, and a polyhalogenated cyclopentadiene having the formula: to 50 weight percent halogen said Diels-Alder adduct being present in an effective fire retardant proportion.

2. The fire retardant bituminous composition of claim 1 wherein about 2.5 to 20 weight percent, based on the bituminous material, of a compound selected from the group consisting of antimony compounds, bismuth compounds or arsenic compounds, is admixed with the bituminous composition.

3. The fire retardant bituminous composition of claim 1 wherein the fatty ester is the reaction product of a polyhydric alcohol having between about 2 and about 18 carbon atoms and nonconjugated unsaturated fatty acid of 8 to 26 carbon atoms.

4. The fire retardant bituminous composition of claim 3 wherein the polyhydric alcohol is glycerol.

5. The fire retardant bituminous composition of claim 1 wherein the fatty ester is safflower oil.

6. The fire retardant bituminous composition of claim 1 wherein the polyhalogenated cyclopentadiene is hexachlorocyclopentadiene.

7. The fire retardant bituminous composition of claim 1 wherein the Diels-Alder adduct is admixed with the bituminous material in a proportion of about 2.5 to 50 weight percent, based on the weight of the bituminous material.

8. A fire retardant bituminous composition comprising (a) a bituminous material, (b) about 2.5 to 20 weight percent based on the weight of the bituminous material of a Group Va compound selected from the group consisting of arsenic compounds, antimony compounds and bismuth compounds and (c) about 2.5 to 50 weight percent based on the weight of the bituminous material of the Diels-Alder adduct of safflower oil and hexachlorocyclopentadiene, said adduct containing about 10 to 50 weight percent halogen.

9. The fire retardant bituminous composition of claim 8 wherein the Group Va compound is antimony trioxide.

10. The fire retardant bituminous composition of claim 8 wherein the Group Va compound is lead arsenate.

11. The fire retardant bituminous composition of claim 8 wherein the Group Va compound is antimony sulfide.

12. A method of rendering a bituminous composition fire retardant comprising incorporating into a bituminous material 1 to about 25 weight percent halogen comprising mixing with said bituminous material, about 2.5 to 50 weight percent based on the bituminous material of the Diels-Alder adduct of a nonconjugated unsaturated fatty ester reaction product of mono- or polyhydric alcohols having between about one to about 18 carbon atoms, and non-conjugated, ethylenically unsaturated fatty acids having between about 8 and about 26 carbon atoms, and a polyhalogenated cyclopentadiene having the formula:

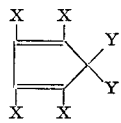

wherein X is selected from the group consisting of fluorine, chlorine and bromine, and Y is selected from the group consisting of fluorine, chlorine, bromine and an alkoxy radical containing from about 1 to about 10 carbon atoms, said Diels-Alder adduct containing about 10 to 50 weight percent halogen.

13. The method of claim 12 wherein 2.4 to 20 weight percent of a compound selected from the group consisting of antimony compounds, arsenic compounds, or bismuth compounds, said weight being based on the bituminous material.

14. The method of claim 13 wherein the fatty ester is safflower oil.

15. The method of claim 12 wherein the polyhalogenated cyclopentadiene is hexachlorocyclopentadiene.

16. A method of rendering a bituminous composition fire retardant comprising incorporating into a bituminous material, 2.5 to 20 weight percent of a compound selected from the group consisting of antimony compounds, arsenic compounds, or bismuth compounds, and about 2.5 to 50 weight percent of the Diels-Alder adduct of safflower oil and hexachlorocyclopentadiene, said weights being based on the bituminous material and said adduct containing about 10 to 50 weight percent halogen.

17. A fire retardant article comprising an article having a surface coated with a bituminous composition comprising (a) a bituminous material and (b) the Diels-Alder adduct of a nonconjugated unsaturated fatty ester reaction product of mono- or polyhydric alcohols having between about one to about 18 carbon atoms, and non-conjugated ethylenically unsaturated fatty acids having between about 8 and about 26 carbon atoms, and a polyhalogenated cyclopentadiene having the formula:

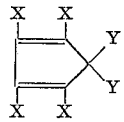

wherein X is selected from the group consisting of fluorine, chlorine and bromine, and Y is selected from the group consisting of fluorine, chlorine, bromine and an alkoxy radical containing from about 1 to about 10 carbon atoms, said Diels-Alder adduct containing about 10 to 50 weight percent halogen said Diels-Alder adduct being present in an effective fire retardant proportion.

18. A fire retardant article comprising an article having a surface coated with a bituminous composition comprising (a) a bituminous material, (b) about 2.5 to 20 weight percent based on the weight of the bituminous material of a Group Va compound selected from the group consisting of arsenic compounds, antimony compounds and bismuth compounds and (c) about 2.5 to 50 weight percent based on the weight of the bituminous material of the Diels-Alder adduct of safflower oil and hexachlorocyclopentadiene, said adduct containing about 10 to 50 weight percent halogen.

References Cited

UNITED STATES PATENTS

| | | | |
|---|---|---|---|
| 3,031,425 | 4/1962 | Schoeptle et al. | 106—15 |
| 3,189,513 | 4/1962 | Calderwood et al. | 106—15 |
| 3,255,227 | 6/1966 | Weil | 252—8.1 |

DONALD J. ARNOLD, Primary Examiner.

L. HAYES, Assistant Examiner.

U.S. Cl. X.R.

106—17, 281; 117—137; 252—8.1

PO-1050
(5/69)

UNITED STATES PATENT OFFICE
CERTIFICATE OF CORRECTION

Patent No. 3,433,654        Dated March 18, 1969

Inventor(s) Charles S. Ilardo and Raymond R. Hindersinn

It is certified that error appears in the above-identified patent and that said Letters Patent are hereby corrected as shown below:

Column 7, lines 71 and 72, Claim 1, the words "adduct a" should read ---adduct of a----. Column 9, line 26, Claim 13, the figure "2.4" should read ---2.5----. Column 9, line 31, Claim 14, the claim reference numeral "13" should read ---12---.

SIGNED AND
SEALED
JUN 9 1970

(SEAL)
Attest:

Edward M. Fletcher, Jr.
Attesting Officer

WILLIAM E. SCHUYLER, JR.
Commissioner of Patents